No. 735,671. Patented August 4, 1903.

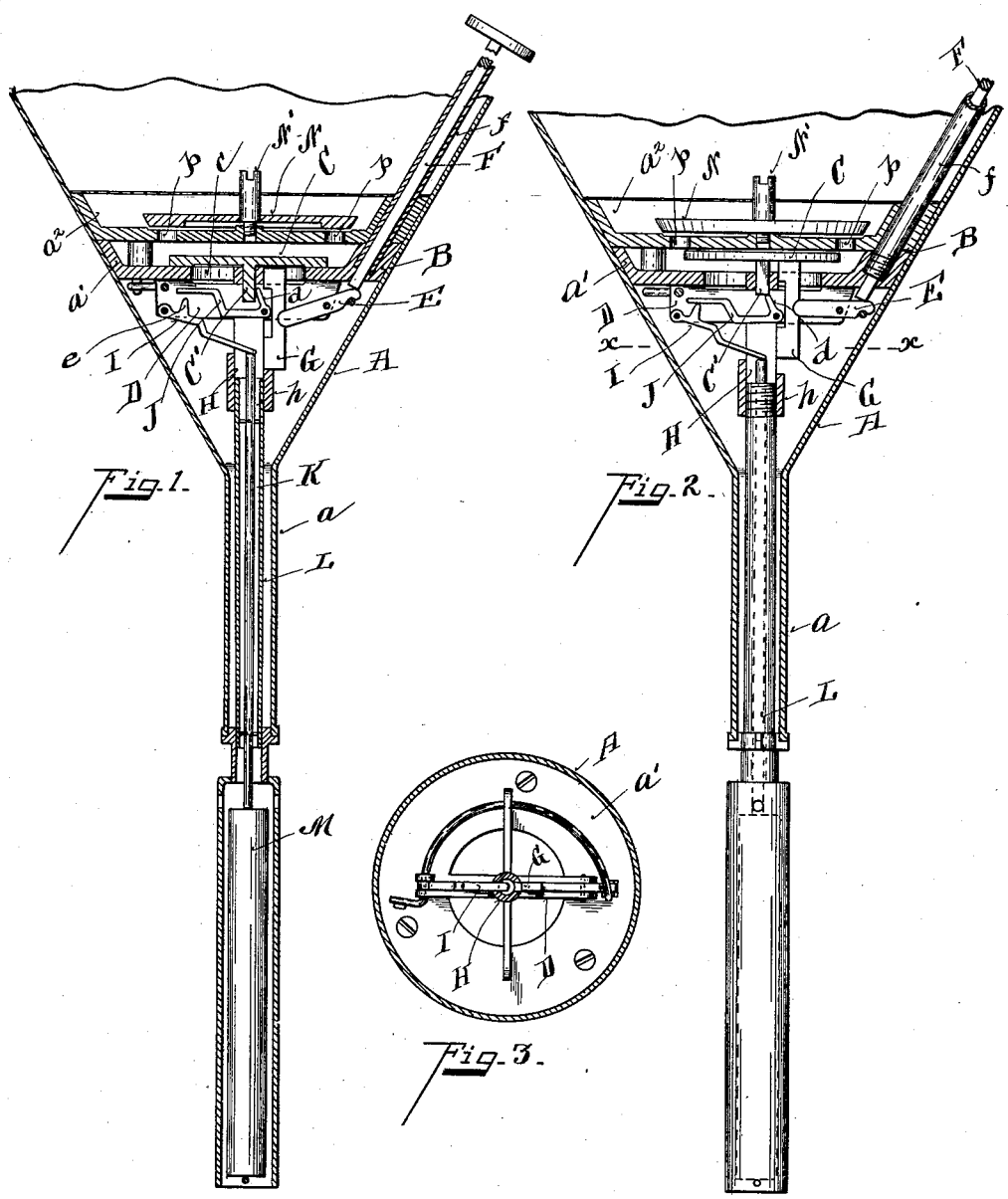

UNITED STATES PATENT OFFICE.

JOHN KNOCHE, OF CINCINNATI, OHIO, ASSIGNOR OF ONE-HALF TO HELEN VOCKE, OF CINCINNATI, OHIO.

AUTOMATIC CLOSING-VALVE.

SPECIFICATION forming part of Letters Patent No. 735,671, dated August 4, 1903.

Application filed April 1, 1903. Serial No. 150,518. (No model.)

*To all whom it may concern:*

Be it known that I, JOHN KNOCHE, a citizen of the United States, residing at Cincinnati, in the county of Hamilton and State of Ohio, have invented certain new and useful Improvements in Automatic Closing Valves, of which the following is a specification.

My invention relates to a valve mechanism primarily adapted to be employed in a filling utensil, such as a funnel, used for transferring liquids.

The object of my invention is to produce an automatic valve mechanism actuated by the height of the liquid in the vessel to be filled and so constructed as to be readily reset.

My invention further comprises the arrangement of valve and trip mechanism hereinafter described and claimed.

The features of my invention are more fully set forth in the description of the accompanying drawings, forming a part of this specification, in which—

Figure 1 is a central vertical section of my device in closed position. Fig. 2 is a similar section, partly in elevation, showing the valve in open position. Fig. 3 is a bottom view taken on line $x\ x$, Fig. 2.

A represents a funnel having a stem $a$.

B represents the valve-casing the peripheral sides of which fit the inside periphery of the funnel. It is provided with the two disks $a'\ a^2$, of which disk $a^2$ is on top and provided with the admission-orifices $b$. Disk $a'$ is under and is provided with an admission-orifice $c$, which is controlled by a valve-disk C, lying upon disk $a'$ and covering the said orifice $c$.

C' represents the valve-stem of said valve-disk C projecting downwardly through disk $a'$. The valve-casing B is provided with a depending bracket D, to which are pivoted the following trip-levers.

E represents a lever against the outer edge of which a push-rod F engages, which push-rod slides in a stem $f$, supported parallel with the side of the funnel. The other side of said lever E bears against or projects into a notch in a vertically-sliding block G. This block bears against the side of a tube H, suspended from the valve-casing B into the stem $a$ of the funnel A. The lower end of this block G rests upon a flange $h$ of the tube H. The upper end of this block G projects through the disk $a'$ and engages under the valve-disk C. This lever E, push-rod F, and slip-block G are for raising the valve-disk C and for resetting the same.

J represents a bell-crank lever pivoted on bracket D, the short arm $d$ of which lever rests against the side of the valve-stem C', as shown in Fig. 1, when the valve is closed and which when the valve is raised occupies the position under the valve-stem, holding the valve-disk up, as shown in Fig. 2.

I represents a trip-lever pivoted on bracket D, having a short upwardly-projecting finger $e$, which engages the long arm of the lever J when the valve is raised, as shown in Fig. 2. Lever I has a long finger projecting into the tube H and resting against a connecting-rod K therein.

L represents a cylinder supported from the end of the tube H, within which cylinder is a float M, upon which is supported the rod K.

N represents an admission-valve-closing disk connected by means of a screw N' to the disk $a^2$ and adapted to be raised or lowered by means of the screw to cover or uncover the orifices $b$, and so opening and closing the funnel independently of the valve mechanism.

Mode of operation: The compartment L is placed in the neck of the bottle or the opening of the vessel to be filled, the valve being in open position, as shown in Fig. 2. When the liquid rises to the top of the vessel and into the compartment L, float M rises, lifting the connecting-rod K, tripping lever I from the engagement with lever J, and so causing the disk-valve C to drop, as shown in Fig. 1, closing the valve-opening $c$.

To raise the valve and reset the same, the rod F is pushed downward, which raises the slip-block G and the valve-disk C, allowing the short arm $d$ of the lever J to fall into the position under the end of the valve-stem C', as previously described and shown in Fig. 2.

It is obvious that this device is automatically tripped by the rise of the liquid to a given height and has to be manually reset for the next operation.

Having described my invention, what I claim is—

1. In a vessel for receiving fluids, a valve-casing, having a disk across the mouth of said vessel, an admission-orifice therein, a disk closing the same, the closing-disk resting on the valve-casing disk, the valve-closing disk having a stem projecting through said casing-disk, a sliding lift engaging the valve-closing disk, a lever engaging said lift, and a push-pin engaging said lever for raising said valve-closing disk, tripping mechanism on the valve-casing adapted to automatically drop into position under said valve-stem supporting the same when the valve-closing disk is raised, and a float adapted to knock the tripping mechanism from supporting position under said valve-stem at a given fluid-level, substantially as described.

2. In a funnel for receiving and transmitting fluids, a valve-casing, a valve-disk across the mouth thereof having an admission-orifice, a valve-closing disk thereon having a stem projecting through the casing-disk, a sliding lift engaging the valve-closing disk, a lever engaging said lift, and a push-pin engaging said lever for raising said valve-closing disk, tripping mechanism adapted to automatically fall into supporting position under the valve-stem when the valve is open, a tube depending from the funnel, and a float therein adapted to actuate said tripping mechanism at a given fluid height, whereby the valve is automatically closed, substantially as described.

In testimony whereof I have hereunto set my hand.

JOHN KNOCHE.

Witnesses:
OLIVER B. KAISER,
LULU BECK.